United States Patent [19]

Neuhaus

[11] Patent Number: 5,385,665
[45] Date of Patent: Jan. 31, 1995

[54] APPARATUS FOR THE FOAMING OF ORGANIC COMPONENTS IN WATER

[76] Inventor: Adolf Neuhaus, Breckerfelder Str. 135, W-5828 Ennepetal-Oberbauer, Germany

[21] Appl. No.: 57,303

[22] Filed: May 4, 1993

[30] Foreign Application Priority Data

May 4, 1992 [DE] Germany ............... 4214318

[51] Int. Cl.⁶ ............... B01D 17/035; A01K 63/04
[52] U.S. Cl. ............... 210/169; 210/170; 210/221.2; 210/242.2; 119/261
[58] Field of Search ............... 210/169, 170, 221.2, 210/242.2, 703; 261/DIG. 75, 120, 76; 119/263, 261

[56] References Cited

U.S. PATENT DOCUMENTS

| | | |
|---|---|---|
| 3,032,199 | 5/1962 | Sumiya . |
| 3,828,935 | 8/1974 | Rovel . |
| 3,936,381 | 2/1976 | Pacaud . |
| 3,965,007 | 6/1976 | Conn . |
| 3,994,811 | 11/1976 | Cohen . |
| 4,157,304 | 6/1979 | Molvar . |
| 4,210,534 | 7/1980 | Molvar . |
| 4,215,082 | 7/1980 | Danel . |
| 4,690,756 | 9/1987 | Van Ry ............... 210/170 |
| 4,964,576 | 10/1990 | Datta . |
| 5,006,230 | 4/1991 | Votava . |
| 5,078,867 | 1/1992 | Danner . |
| 5,122,266 | 6/1992 | Kent . |
| 5,251,764 | 10/1993 | Niiti . |
| 5,282,962 | 2/1994 | Chen . |

FOREIGN PATENT DOCUMENTS

| | | |
|---|---|---|
| 2064144 | 9/1992 | Canada . |
| 146235 | 10/1984 | European Pat. Off. . |
| 3542811 | 6/1987 | Germany . |

Primary Examiner—Thomas M. Lithgow
Attorney, Agent, or Firm—Herbert Dubno

[57] ABSTRACT

An apparatus for the foaming of organic components in sea water or sweet water has above a pump or other bottom part capable of forcing water upwardly an upstanding aeration vessel in which a mixture of air and water induces foaming, the excess water passing over a weir from this vessel while the bubbles ascend to a riser made up of a multiplicity of wall parts, e.g. a multiplicity of thin tubes or concentric tubes with partitions dividing them into segments, such that the bubbles remain substantially intact without bursting as they rise and capillary displacement of water is precluded. The foam can be collected in a receptacle around this riser.

1 Claim, 3 Drawing Sheets

APPARATUS FOR THE FOAMING OF ORGANIC COMPONENTS IN WATER

SPECIFICATION

1. Field of the Invention

My present invention relates to an apparatus for the foaming of foamable components, usually organic contaminants, which may be present in sweet water or sea water and which, as a result of the foaming action, can be removed from the water. More particularly, the invention relates to an apparatus for the foaming of organic components of either sea water or fresh water (hereinafter referred to as sweet water) which utilizes the introduction of air into the water to form bubbles which are allowed to rise to a point above the level of water, e.g. in a reservoir, aquarium or the like.

2. Background of the Invention

It is known to provide, especially for sea water, aquariums and the like, an apparatus for the foaming of organic components which may be present therein which can include a pump adapted to draw the water into a bottom portion of the apparatus, with or without aeration of the water which is thus drawn in, and a riser into which the water is forced so that the bubbles formed by the organic components can be carried upwardly and discharged.

A device for introducing air into the water drawn in by the pump is disclosed, for example, in German patent 35 42 811 which allows air to be mixed in a finely-divided form with the water stream.

The outlet from the pump opens into a vessel which is fastened on the bottom part containing the pump. In the region of the bottom of this vessel there is an outlet for the water which communicates with a weir forming an overflow near the top of the vessel.

The weir or overflow allows the water to be returned to the aquarium. The mouth of the vessel communicates with a riser which, in turn, is surrounded by a collecting vessel which serves as a recipient for the foamed organic constituents. In operation, the foam draws water from the aquarium into the bottom portion of the apparatus, forces the water into the vessel above the foam, the water being aerated so that, within this latter vessel, bubbles are formed which entrain organic components upwardly into the riser.

At the top of the riser, which lies above the level of liquid in the aquarium, the organic foam can cascade into the collecting vessel surrounding the riser. Simultaneously, water from which the bubbles and the organic foam has separated, can pass through the opening at the bottom of the aerating vessel and then over the weir back into the reservoir.

The opening into the riser lies approximately at the level of the water within the aerating vessel.

The sole outlet for the air from the aerating vessel is thus formed by the riser pipe whose bottom is sealingly connected to the mouth of the aerating vessel and which traverses the collecting receptacle. The bottom of the collecting receptacle may have a hole communicating with the riser pipe for this purpose.

It is apparent that in the aerating vessel, therefore, the finely divided air will give rise to bubbles of foam onto which the organic components of the water can adhere or which are formed by the organic components in the water so that these bubbles and foam will rise in the aeration vessel and pass into the riser pipe.

As has already been indicated, the bubbles pass upwardly in the riser pipe which can have a length so dimensioned that the foam is practically dry when it reaches the top of the riser pipe and, therefore, such that excess water which may have been entrained with the foam can drain back into the underlying aeration vessel.

The bubbles tend to burst at the upper end or mouth of the riser pipe and/or pass over the edge of the mouth into the collecting receptacle disposed outwardly thereof. As a consequence, the organic components which were entrained upwardly with the bubbles or were foamed by the air can be deposited in the receptacle disposed outwardly of the mouth of the riser pipe and discharged.

In practice, this apparatus has been found to be highly effective. However, since rapid removal of organic contaminants from water is of considerable importance, efforts have been made to utilize high capacity pumps in such apparatus. In practice it has been found that the apparatus as described, can allow only a limited foaming capacity or rate. If excess volumetric rates of flow are generated, the water, instead of passing over the weir back into the body of water from which the contaminated liquid was withdrawn, can be driven out through the riser tube and can reduce the effectiveness of the collection and the separation of the organic constituents from the water.

Furthermore, when attempts were made to use this apparatus for the removal of organic contaminants from sweet water in aquariums, ponds, basins or the like, it was found that because of the surface tension differences between sea water and fresh water, the bubble formation and foaming was not reliable or that bubble formation did not occur or was insufficient to cause an ascent of bubbles in foam in the riser pipe.

OBJECTS OF THE INVENTION

Accordingly, it is the principal object of the present invention to provide an improved apparatus for the foaming of organic constituents in water which will be effective both for the foaming of sea water and sweet water contaminated with organic constituents.

A more specific object of the invention is to provide an improved apparatus for the foaming of organic components contained in water, either sea water or sweet water, which obviates drawbacks of earlier systems.

Still another object of the invention is to provide an improved apparatus for the foaming of organics in water which more reliably can ensure the foaming action and the stability of the foam as it passes upwardly from the apparatus for collection.

SUMMARY OF THE INVENTION

These objects and others which will become apparent hereinafter are attained, in accordance with the invention, in an apparatus which comprises a bottom part containing a pump having a water intake and which can be positioned in a body of water to be decontaminated by the foaming of organic constituents thereof. Above the pump or bottom portion, the apparatus is provided with an aeration vessel in which possible formation can take place and to which air is fed, e.g. through the intake to the pump as already noted or by an aerator disposed within this vessel, the aeration vessel being surmounted by a wall structure provided with a multiplicity of spaced-apart but closely juxtaposed wall portions defining an upward path for the foam.

More particularly, the riser pipe of the present invention is formed with a multiplicity of closely adjoining wall portions which extend vertically from a perforated bottom which is provided on the lower mouth of the riser pipe and which extend to the upper mouth thereof which can be surrounded in turn, by the receptacle in which the organic foam is collected. The wall parts can be formed, according to the invention, by a multiplicity of riser tubes of small cross section whose total cross section or lumen cross section can at least correspond to that of a single riser tube for delivering the bubbles as previously described. The total lumen cross section of the small riser tubes should, therefore, correspond to the flow cross section for the foam or bubbles which allows the foam to readily be discharged from the underlying aeration vessel without permitting significant flow of liquid therethrough.

The invention is not, of course, limited to use with aquariums but can also be employed for large water units, for example, ponds, pools, basins and even natural bodies of water, like lakes, streams and the like.

It is also not limited necessarily to apparatus for cleaning water in place as has generally been described, but it can, if desired, be connected by pipes or ducts to the source of water to be cleaned and to collectors of cleaned water, where appropriate. Utilizing such pipes and ducts, for example, organically contaminated water can be drawn from any source, cleaned and returned to any other body of water or consuming basin or apparatus.

Furthermore, a receptacle which surrounds the foam outlet of the apparatus is not always required. For example, when the apparatus is disposed adjacent a system requiring cleaning like an aquarium or pond, it is possible to draw off the contaminated foam by other means, utilizing any convenient technique as long as the contaminated substances are not permitted to return to the clean water and preferably also not to the water to be cleaned.

The additional wall surfaces in the riser tube resulting from the presence of the individual small-diameter tube, or by subdividing the riser tube into a plurality of coaxial tubes which may additionally be provided with vanes or partitions in the spaces between the coaxial tubes, allows substantially higher throughputs of air and hence of foam to be generated without significant entrainment of the water with the foam.

The foaming rate is increased and, because of the very small flow cross sections traversed by the foam, a larger amount of air can be utilized in the foaming action to entrain increased quantities of organic contaminants in a short time from the water than has been the case heretofore.

Since the free cross sections of the individual tubes and passages can be held comparatively small while nevertheless not interfering with a high rate of flow of air through the system, foam bubbles can rise from sweet water as well as from sea water and thus premature rupture of the bubble as has characterized the use of the prior art system in sea water, cannot occur in all cases. Of course, the flow cross sections should not be made so small that a capillary action will result. Stated otherwise, the cross sections should not be small enough to contaminate or should be sufficiently large to avoid capillary action. The reference to capillary action is, of course, a reference to any tendency by capillarity to draw water from the underlying vessel upwardly along the flow cross sections by surface tension effects.

The length of the riser is so dimensioned that the foam will be sufficiently dry at the top of the riser that practically no water is entrained with the bubble, excess water returning through the passages to the underlying vessel.

The term "wall" as used herein to refer to the parts defining the channels of the riser is intended to be used in its broadest possible sense to refer to the wall portions of closed channels or quasitubular channels or channels of cross sections other than the round cross sections of circular tubes. It also is used to refer to elements like upright rods or like members which do not define any peripherally closed channel, but only provide a continuous wall element running from the openings at the bottom of the riser to the top of the riser along which bubbles and foam of the organic substances can be guided and which can confine the bubbles and foam between them.

Such wall parts can be formed by tubes as indicated previously or coaxial pipes which are subdivided by vanes or webs into a plurality of segments of the same lengths, or combinations thereof which guide the bubbles upwardly and yet are of a sufficiently small spacing between opposing wall parts that premature collapse of the bubbles does not occur, even with use of the apparatus in sweet water. The preferred embodiment of the invention, however, provides the wall parts with circular cross section surfaces or parts which define circular cross sections for the passages.

These latter shapes correspond to the ball-shaped configuration or spherical configuration of the rising bubbles and promote the upward transport of the bubbles together with the organic components which adhere thereto. In an especially preferred embodiment, the wall parts are formed by an array of closely-spaced thin-walled narrow tubes which, however, are of greater cross section than capillary tubes as defined above.

For example, on a perforated bottom plate which can be mounted on the mouth of the underlying aerating vessel, each of the holes of the perforated plate can have a thin riser tube connected thereto. Preferably between the wall parts and as formed by the thin tubes, cross sections of a diameter of less than 8 mm and more than 3 mm are provided for movement of the bubbles therethrough in the upward direction.

The smallest possible cross section for each of the small diameter tubes is selected which allows the rise of the bubbles in both sea water and with sweet water and which does not bring about a capillary rise in liquid. A cross section equivalent to a diameter of 6 mm to about 3 mm is preferred.

When the riser is formed from a plurality of concentric tubes, the spacing of the walls of the tube from one another is preferably between 3 and 8 mm.

The ribs or vanes between the tubes, which divide them into segmental chambers, are preferably peripherally spaced by about 3 to 8 mm and run the full height of the riser.

BRIEF DESCRIPTION OF THE DRAWING

The above and other objects, features and advantages of the invention will become more readily apparent from the following description, reference being made to the accompanying highly diagrammatic drawing in which.

SPECIFIC DESCRIPTION

Figure 1:
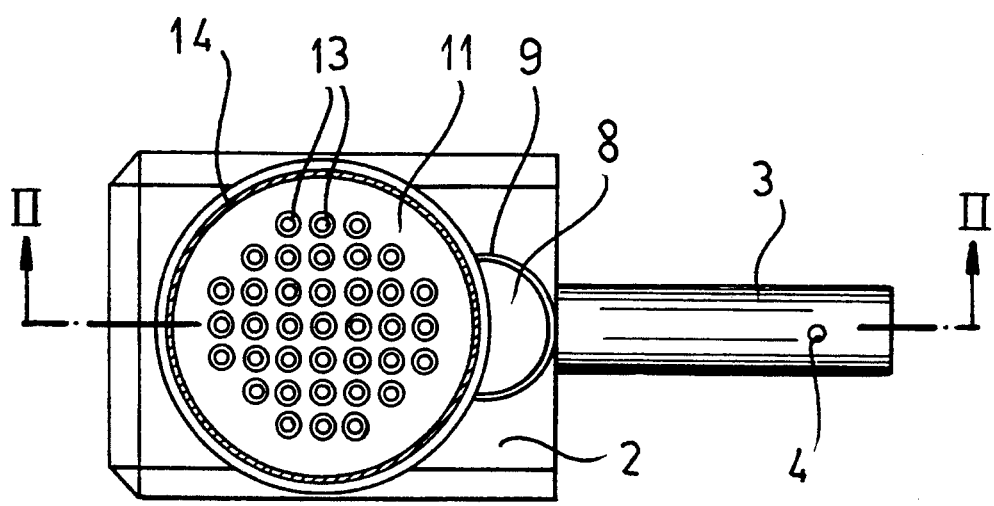
FIG. 1 is a plan view of an apparatus according to the invention seen generally along the line I—I of FIG. 2.
Figure 2:
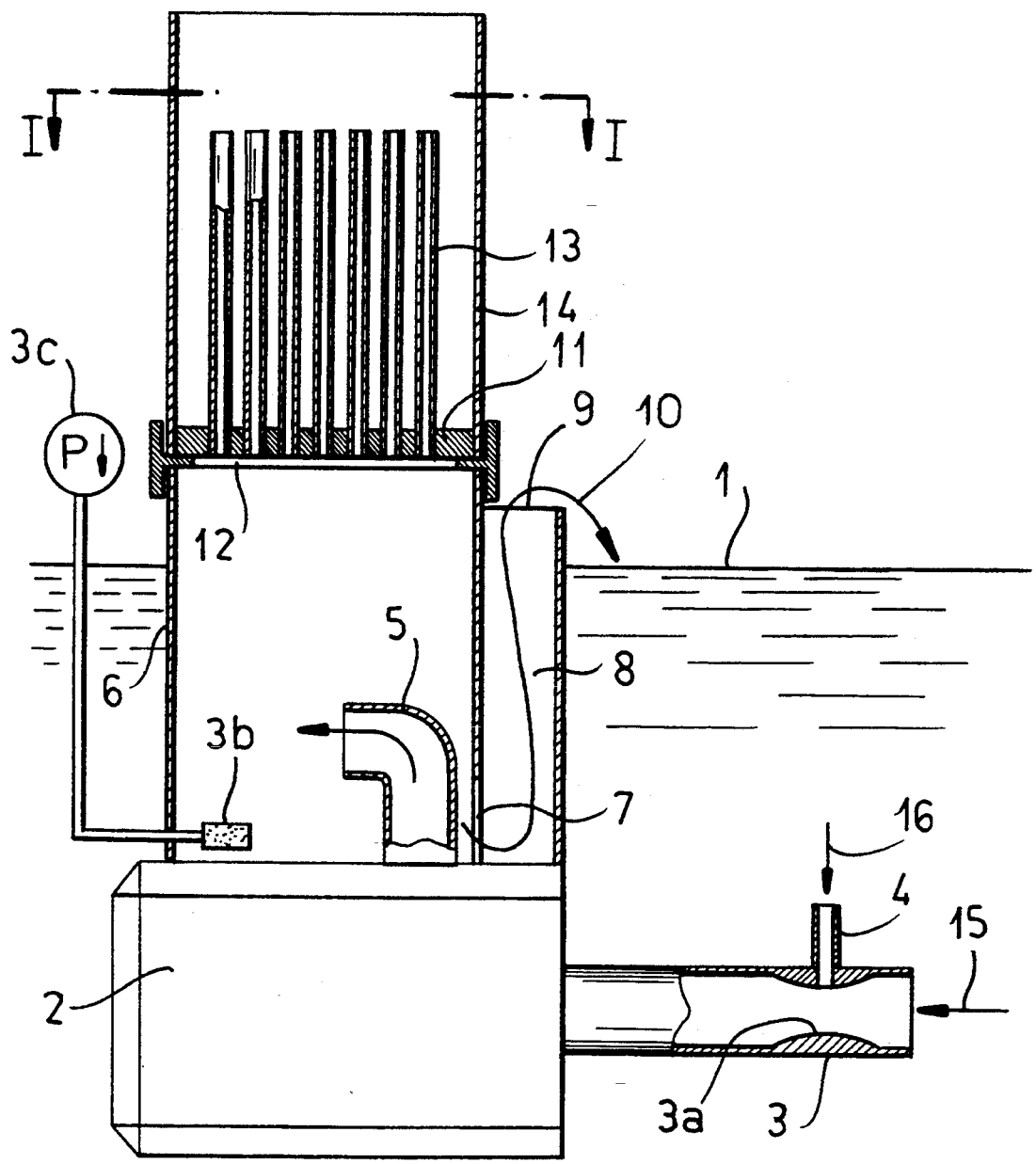
FIG. 2 is a cross sectional view taken along the line II—II of FIG. 1 at least in part and partially seen in elevation.

The foaming apparatus shown in FIGS. 1 and 2 is intended to produce a foam from organic contaminants in water and is immersed, for example, in a body of water such as an aquarium, the level of which is schematically represented at 1 in FIG. 2.

The apparatus here shown is intended to be set directly into the body of water and comprises a bottom part 2 housing a pump which draws water into the pump through an intake fitting 3 from the aquarium. As can be seen in FIG. 2, the intake fitting 3 is formed with a venturi 3a at which air can be drawn into the water through a radial fitting 4, referred to herein as an airfeed fitting, which can be connected to the atmosphere via a flexible tube opening above the level 1 of water in the aquarium. The venturi 3a is defined to induce suction in the fitting 4 as water is pumped therethrough. Alternatively, an air tube connected to an air pump or other source of air under pressure can be provided with an aerating stone or other air distributor which is provided upstream of the pump or at the bottom of the aerating vessel 6.

The air tube, not shown, can be fitted over the fitting 4 which has been illustrated in FIG. 2 to supply air to the device.

From the pump bottom part 2, a discharge fitting 5 can extend and, in the embodiment of FIG. 2, extends upwardly into the aeration vessel 6. The latter is seated directly on the bottom part 2 and is sealed thereagainst.

The vessel 6 is tubular and in the embodiment illustrated has its lower end closed against the bottom part 2. At its upper end or mouth, the vessel 6 is open. The vessel 6 is, as seen in FIG. 2, vertical and is disposed in an upright manner in the body of water to be decontaminated from organic components.

The vessel 6 is formed near its bottom (adjacent bottom part 2) with a radial opening 7 communicating with a vertical duct 8 which forms at its upper end a weir 9 over which water passing from the vessel 6 through the opening 7 can overflow to be recycled to the aquarium as represented by the arrow 10.

As has been indicated, the air supply to the aerating vessel 6 can be effected by other means, e.g. the use of a bubbler which can be fed from a compressed air pipe and lying at the bottom of the vessel 6. The air pump for this purpose can be electrically driven. By means of the air pump, air can be dispersed in finely-divided form into water in the vessel 6.

To achieve best possible mixture of the air with the water in the apparatus of the invention, it is important that the air input to the aeration vessel 6 be located close to the bottom. Of course, when the air input utilizes a venturi induction of air through the fitting 4 into the pump, the air and the water enter through the outlet fitting. If, however, an aeration block 3b, i.e. a porous air distributing block, is provided at the bottom of the vessel 6, it may be provided with the electrically driven air pump 3c represented diagrammatically in FIG. 2.

At the upper mouth of the aeration vessel 6, a bottom plate 11 is mounted and has an underside which lies close to or at the water level 12 in the vessel 6.

This bottom plate 11 is formed with a multiplicity of holes in which thin riser tubes 13 are sealingly fitted. The riser tubes collectively form the riser mentioned previously.

The riser tubes 13 are mutually parallel and extend parallel to the vertical median axis of the vessel 6 and open at their upper ends as can be seen in FIG. 2.

The riser formed by the tubes 13 is surrounded with a radial clearance by a cup-shaped collecting receptacle 14 whose bottom is formed by the bottom 11.

The entire unit formed by the bottom 11, the riser tubes 13 and the collecting receptacle 14 is releasably mounted on the upper mouth of the vessel 6 so that the contaminants collected in the receptacle 14 can be dumped upon removal of the receptacle 14 from the mouth of the aeration vessel 6.

The lumen or internal cross section of the riser tubes 13 collectively is matched to the air quantity supplied to the aeration vessel 6, e.g. via air inlet 4 or the air supply 3b. 3c. The cross section is so selected that the foaming air as it emerges from the water at the level 12, all can escape through the riser tubes 13 and no air head will build up to a significant degree in the aeration vessel 6. The individual cross sections or lumens of the tubes 13 can correspond to a diameter of less than 8 mm and about 3 mm.

In operation of the apparatus, water is drawn in as represented by the arrow 15 through the intake 3 by the pump 2 from the aquarium or other body of water, whereby simultaneously via a tube or the like open to the atmosphere or is drawn in the direction of arrow 16 by the venturi effect and is mixed with the water supplied to the pump 2.

This mixture of air and water is forced into the aeration vessel 6 through the outlet fitting 5 from the pump and additional air can be supplied at 3b.

Excess water, from which the air separates in bubbles in the vessel 6, passes through the outlet 7 upwardly in the standpipe 8 and overflows across the weir 9 as represented by the arrow 10.

The air, in the form of bubbles to which the organic components adhere, rises in the aeration tubes 13 and moves upwardly along these tubes without substantial bursting.

Excess water drains back from these tubes into the aeration vessel 6 while the practically dry foam emerges from the tops of the tubes 13, at which the foam bubbles can burst and the organic residue can cascade into the receptacle 14 where the organic residue and residual foam are collected.

The diameters of the riser tubes 13 is so selected that they allow upward movement of the foam bubbles without bursting in these tubes. However, the diameter should not be so small that a capillary effect with undesired water transport can arise.

If desired, the receptacle 13 can be provided with a perforated cover on which a collar or the like can be provided for retaining contaminants in the receptacle or delivering the contaminants to still another collector.

The apparatus has been found to provide an especially intense and rapid removal of organic components by the foaming of sea water. The apparatus, however, can also operate in sweet water in spite of the higher surface tension of sweet water because of the relatively small cross sections of the riser tubes 13 which allow the upward movement of the foam bubbles without significant rupture.

Figure 3:
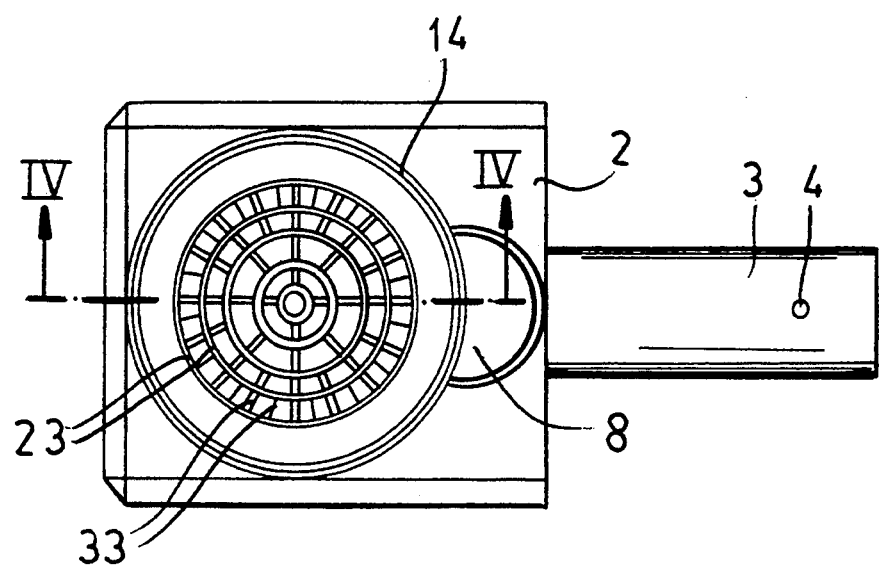
FIG. 3 is a view similar to FIG. 1 of an embodiment in which the riser is formed by coaxial tubes.
Figure 4:
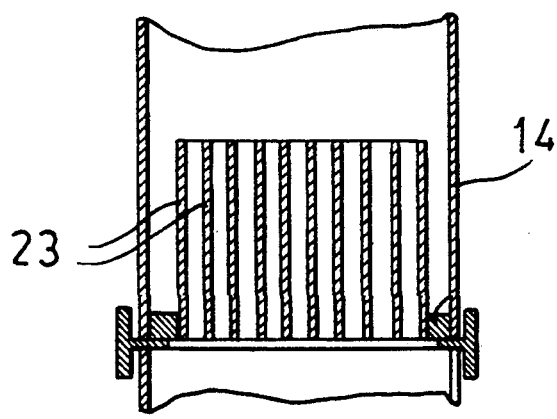
FIG. 4 is a view similar to a portion of FIG. 2 showing the riser in cross section for the embodiment of FIG. 3.

As can be seen from FIGS. 3 and 4, the wall parts which define the small cross section passages in which the bubbles rise can be formed by concentric tubes 23 which are subdivided into segments by partitions 33 extending the full height of the riser formed by the riser consisting of the coaxially-nested tubes. Otherwise the apparatus of FIGS. 3 and 4 operates in the same manner as that of FIGS. 1 and 2.

It will be apparent that the apparatus of the invention is susceptible of considerable variation within the spirit and scope of the appended claims and it is noted that the invention includes all of the novel features described, taken individually and in combination.

I claim:

1. A foaming apparatus for the foaming separation of organic components from seawater or sweet water, comprising:

an upright aeration vessel provided with means for feeding water to said vessel, an overflow for discharging water from said vessel, a vessel mouth formed at the top of said vessel, and means for feeding air to the water in said vessel whereby bubbles are formed at said mouth of said vessel entraining organic components from the water therewith;

a collection unit comprising a bottom plate mounted on the mouth of said vessel and having a plurality of holes therein, and a collecting receptacle connected to said bottom plate and extending upwardly therefrom; and riser means extending upwardly from said bottom plate and communicating with said mouth for conducting said bubbles upwardly through said riser means and into said collection unit, whereby said organic components entrained with said bubbles are removed at an upper end of said riser means, said riser means being formed of a plurality of at least three closely spaced tall thin wall tubes of uniform circular cross section having a constant diameter of between 3 mm and 8 mm and defining upwardly extending passages between them thereby allowing said organic components which rise to the upper end of the riser tubes in said riser means to be deposited into said receptacle after exiting said tubes, each of said tubes extending from a corresponding openings formed in said bottom plate of said collecting unit spanning said mouth of said vessel.

* * * * *